(12) United States Patent
Thomas

(10) Patent No.: US 6,363,873 B2
(45) Date of Patent: Apr. 2, 2002

(54) SHIP FOR RECOVERING FLOATING PETROLEUM PRODUCTS AND MOBILE INSTALLATION USING SUCH RECOVERY SHIPS

(75) Inventor: Pierre-Armand Thomas, Puteaux (FR)

(73) Assignee: Technip France, Courbevoie (FR)

( * ) Notice: Subject to any disclaimer, the term of this patent is extended or adjusted under 35 U.S.C. 154(b) by 0 days.

(21) Appl. No.: 09/779,543

(22) Filed: Feb. 9, 2001

(30) Foreign Application Priority Data

Feb. 11, 2000 (FR) .............................................. 00 01757

(51) Int. Cl.⁷ .............................................. B63B 35/28
(52) U.S. Cl. ....................... 114/26; 114/259; 210/242.3
(58) Field of Search ........................ 210/243.2; 114/26, 114/258, 259

(56) References Cited

FOREIGN PATENT DOCUMENTS

| FR | 2 483 878 | 12/1981 |
|----|-----------|---------|
| FR | 2 589 123 | 4/1987 |
| GB | 1 440 978 | 6/1976 |
| WO | 88/07000 | 9/1988 |
| WO | 94/10026 | 5/1994 |
| WO | 98/57846 | 12/1998 |
| WO | 99/53146 | 10/1999 |

*Primary Examiner*—Jesus D. Sotelo
(74) *Attorney, Agent, or Firm*—Wenderoth, Lind & Ponack, L.L.P.

(57) ABSTRACT

A subject of the invention is a ship (20) for recovering petroleum products floating at the surface of the sea, characterized in that it comprises an open front part equipped with a rotary collecting drum (24) which is partially submerged and comprises longitudinal elements (32) that can be moved with respect to the external surface of this drum (24) between two positions, one projecting, one retracted, a hopper (40) situated behind the said drum (24) for recovering the said petroleum products removed by this drum (24), and means (45) for transferring these products from the hopper (40) to at least one settling and storage tank (46).

Figure 1:
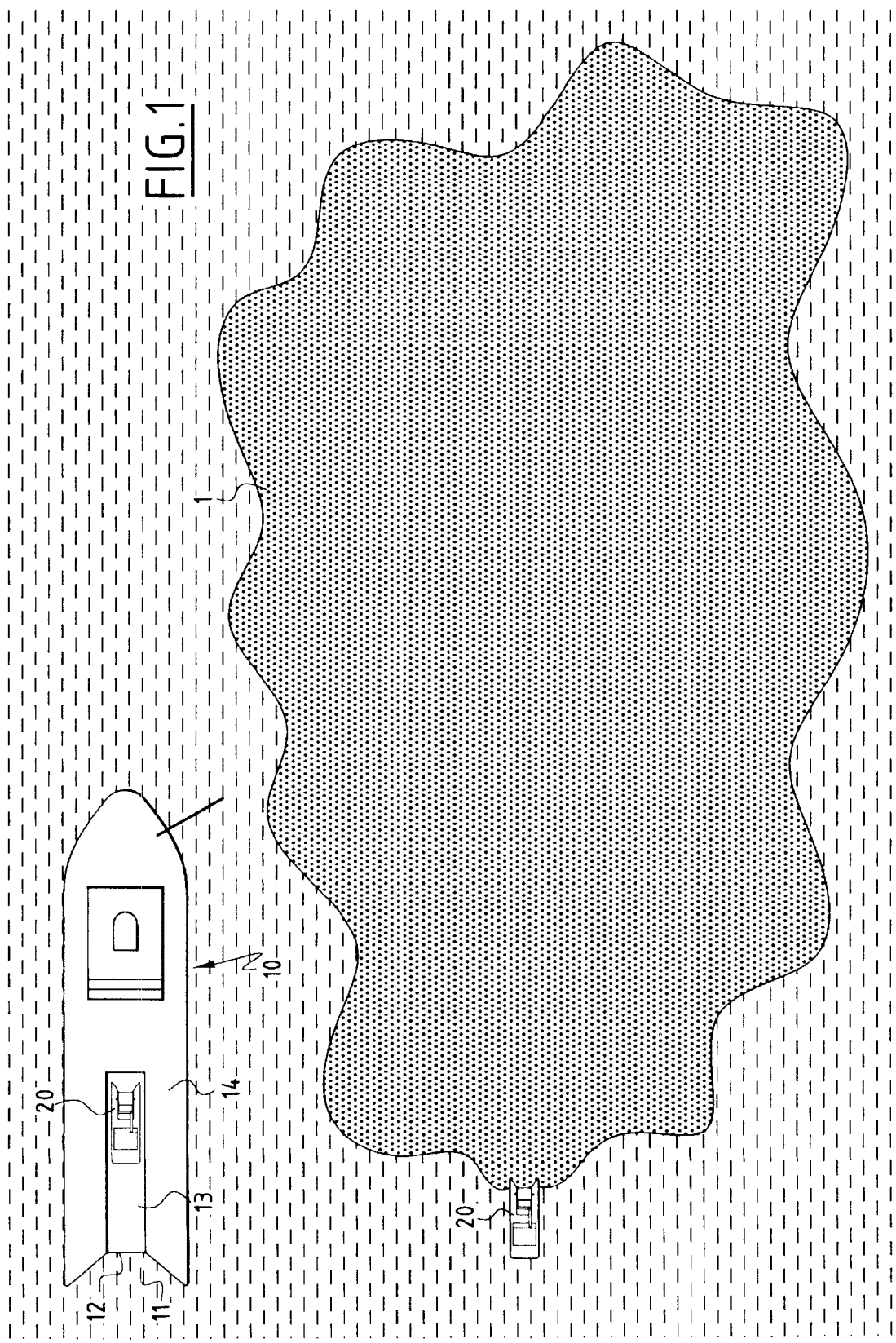

Another subject of the invention is a mobile installation for storing and transporting petroleum products recovered by recovery ships.

23 Claims, 8 Drawing Sheets

SHIP FOR RECOVERING FLOATING PETROLEUM PRODUCTS AND MOBILE INSTALLATION USING SUCH RECOVERY SHIPS

The present invention relates to a ship for recovering petroleum products floating at the surface of the sea and to a mobile installation for storing and transporting these petroleum products.

Numerous methods and devices for containing and removing petroleum products floating on the surface of the sea, for example following a shipwreck or alternatively during uncontrolled discharge from an oil well on the seabed, are known.

One of these devices consists in using a flexible sheet made of a dense material which is kept afloat on the surface of the water at its upper part using floats while the remainder of the collecting device is oriented vertically in the sea, usually under the action of a counterweight placed along its lower edge.

This kind of collecting device has generally to be employed by various ships or by special ships, both in terms of erecting it and in terms of positioning it.

In use, it has become apparent that this known collecting device suffers from numerous difficulties and is not as effective as might be desired as far as containing and collecting petroleum products are concerned, particularly in the case of a sea with a great deal of swell where there are strong currents and short and changeable waves.

As a result of this, given the absence of floating stability, petroleum products may, under certain circumstances, easily escape over or under the sheet.

A certain number of special ships which recover petroleum products which have spread out in large slicks on the surface of the sea and which convey these products to storage reservoirs are also known.

In this respect, a ship which has a ramp that is inclined in its direction of travel, extending above sea level and ending below sea level, configured as a skimmer and which is continued into a collecting reservoir that acts as a settling chamber is known.

This known device is not entirely satisfactory given that its effectiveness is limited because the skimmer, particularly when the sea is rough, recovers a mixture which is essentially made up of water.

Furthermore, the variable level at which the ship sits in the water contributes to the lack of reliability of this type of device.

Recovery ships which comprise intakes connected to pumping means for transferring petroleum products floating on the surface of the sea to a storage reservoir are also known.

However, in the case of petroleum products with a high viscosity, the intakes and the pumping means soon become clogged and the apparatus no longer works.

In general, the collecting ships used have limited effectiveness and are reliant on atmospheric conditions.

In addition, they have a limited storage capacity which means that they have to return frequently to the nearest port to off-load the petroleum products recovered.

To avoid these drawbacks, it is also known practice to use an intermediate ship with a large storage capacity, such as an oil tanker, located near to the polluted zone.

However, in this case also, the transfer of petroleum products between the collecting ships and the storage ship is reliant on the atmospheric conditions and can be carried out only when the sea is calm, thus limiting the speed of intervention of the pollution-fighting means.

Now, it is known that the speed of intervention is an essential factor in preventing slicks of petroleum products from reaching the nearest shoreline.

An object of the invention is therefore to provide a ship for recovering petroleum products floating at the surface of the sea which remedies the aforementioned drawbacks and which allows these products to be collected and removed effectively out at sea.

Another object of the invention is to provide a mobile installation for storing and transporting the petroleum products recovered by such ships.

A subject of the invention is therefore a ship for recovering petroleum products floating on the surface of the sea, characterized in that it comprises:

an open front part equipped with a rotary drum which is partially submerged and comprises longitudinal elements that can be moved with respect to the external surface of this drum between a projecting position and a retracted position, a hopper situated behind the drum for recovering the said products removed by this drum, and means for transferring these products from the hopper to a settling and storage tank.

According to other features of the invention:

the drum comprises a cylindrical outer driven in rotation and equipped, at regular intervals, with longitudinal slots each containing one of the said elements, each element is formed of a vane sliding in the corresponding slot and connected to means of movement between the projecting position for scooping up the petroleum products and the retracted position in the region of the hopper for tipping these products out into the said hopper, the means of moving the sliding vanes are formed, on the one hand, of at least one stationary cam having a cylindrical portion concentric with the outer and corresponding to the projecting position of the vanes and a position curved in towards the centre of the outer and corresponding to the retracted position of the said vanes and, on the other hand, of a guide rail mounted on the edge face of the said cam and intended to collaborate with carriages each connected to the foot of a vane, the outer of the drum is formed of circular sectors separated from one another by spacer pieces forming between the edges of two adjacent sectors the said longitudinal slot and radial passages through which the foot of the corresponding vane passes, the drum can be moved vertically, the drum is associated with means for scraping the external surface of the outer, the scraping means are formed by the upper edge of the front wall of the hopper kept pressed against the external surface of the outer by at least one elastic return member, the lower edge of the front wall of the hopper is hinged about a horizontal axle, the hopper is equipped with a member for scraping the internal surface of the front wall so as to push the petroleum products towards the bottom of the said hopper, the scraping member is formed of a telescopic blade hinged about a hinge pin between the upper and lower edges of the front wall of the said hopper, the side walls of the open front part of the ship comprise intakes for the petroleum products, which intakes are connected to the said storage tank, the recovery ship comprises at least one stabilizer plate which can be moved between a position pressed against the bottom of the hull of this ship and a position away from the said bottom.

Another subject of the invention is a mobile installation for storing and transporting petroleum products, characterized in that it comprises a logistic ship, the hull of which is equipped with at least one storage tank, with a zone for docking with at least one recovery ship as mentioned above and with means for transferring these products from the said recovery ship to the said storage tank.

According to another feature, the docking zone is formed inside the logistic ship and communicates with the sea via the stern of the said logistic ship.

Figure 2:
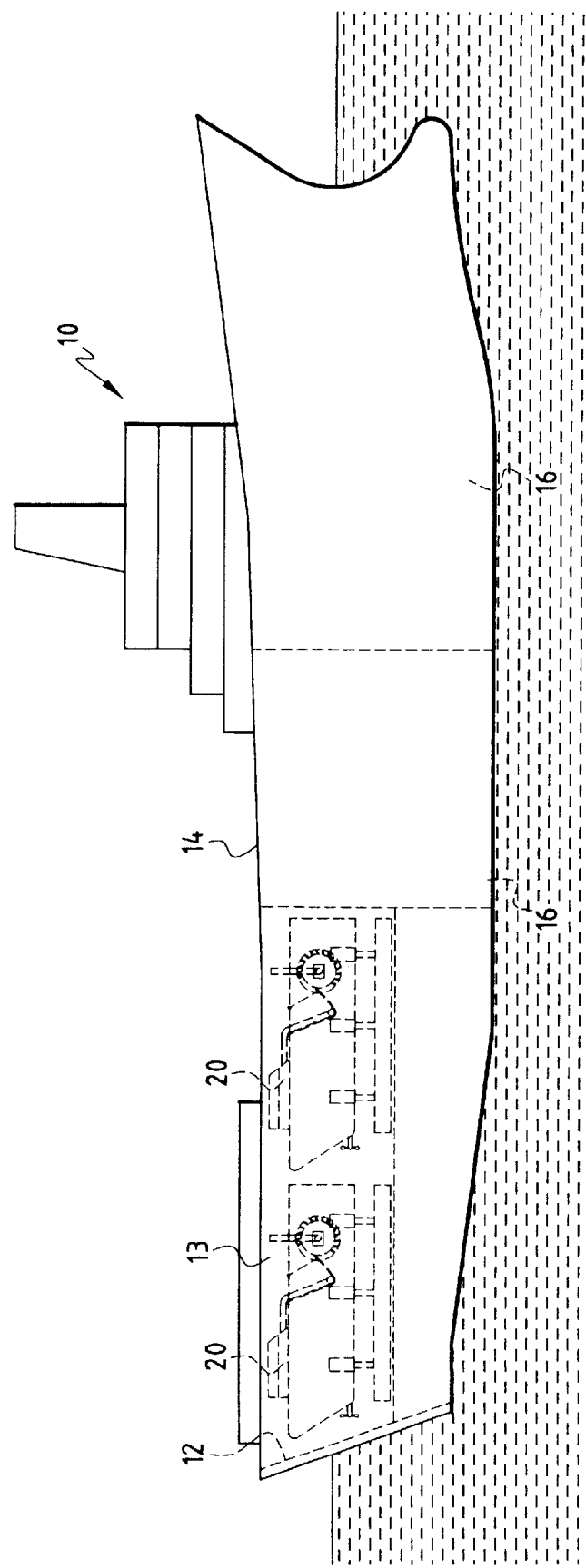
Figure 3:
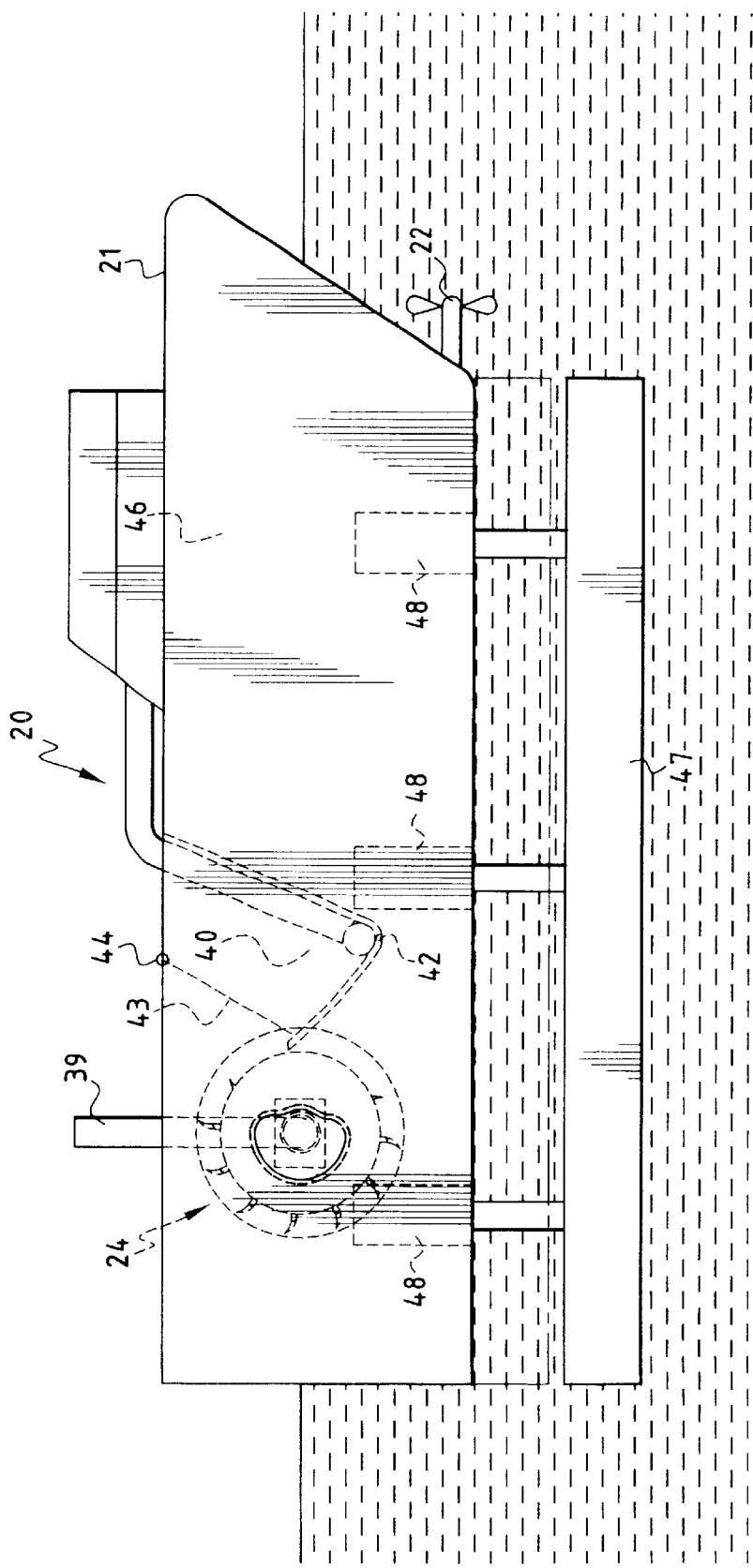
Figure 4:
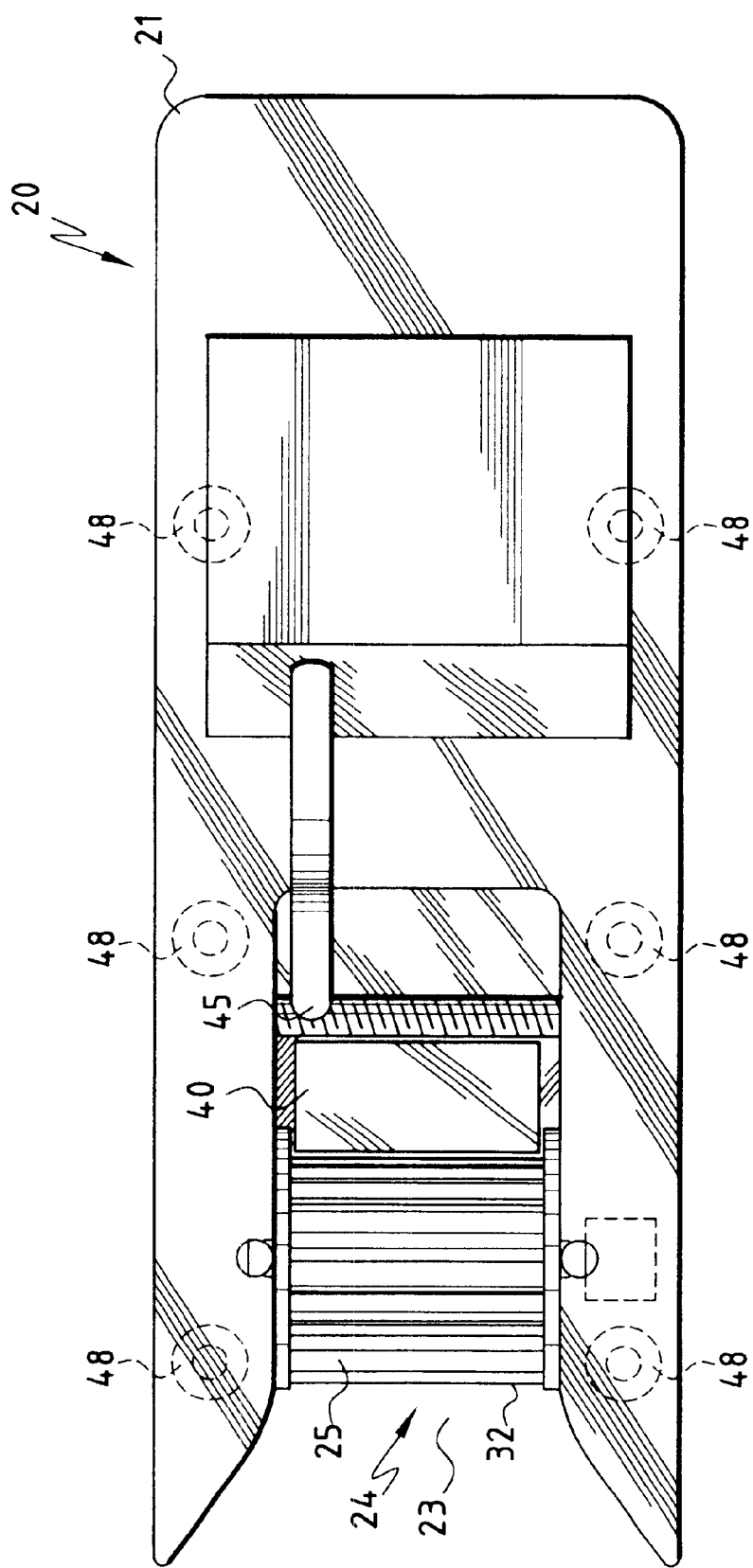
Figure 5:
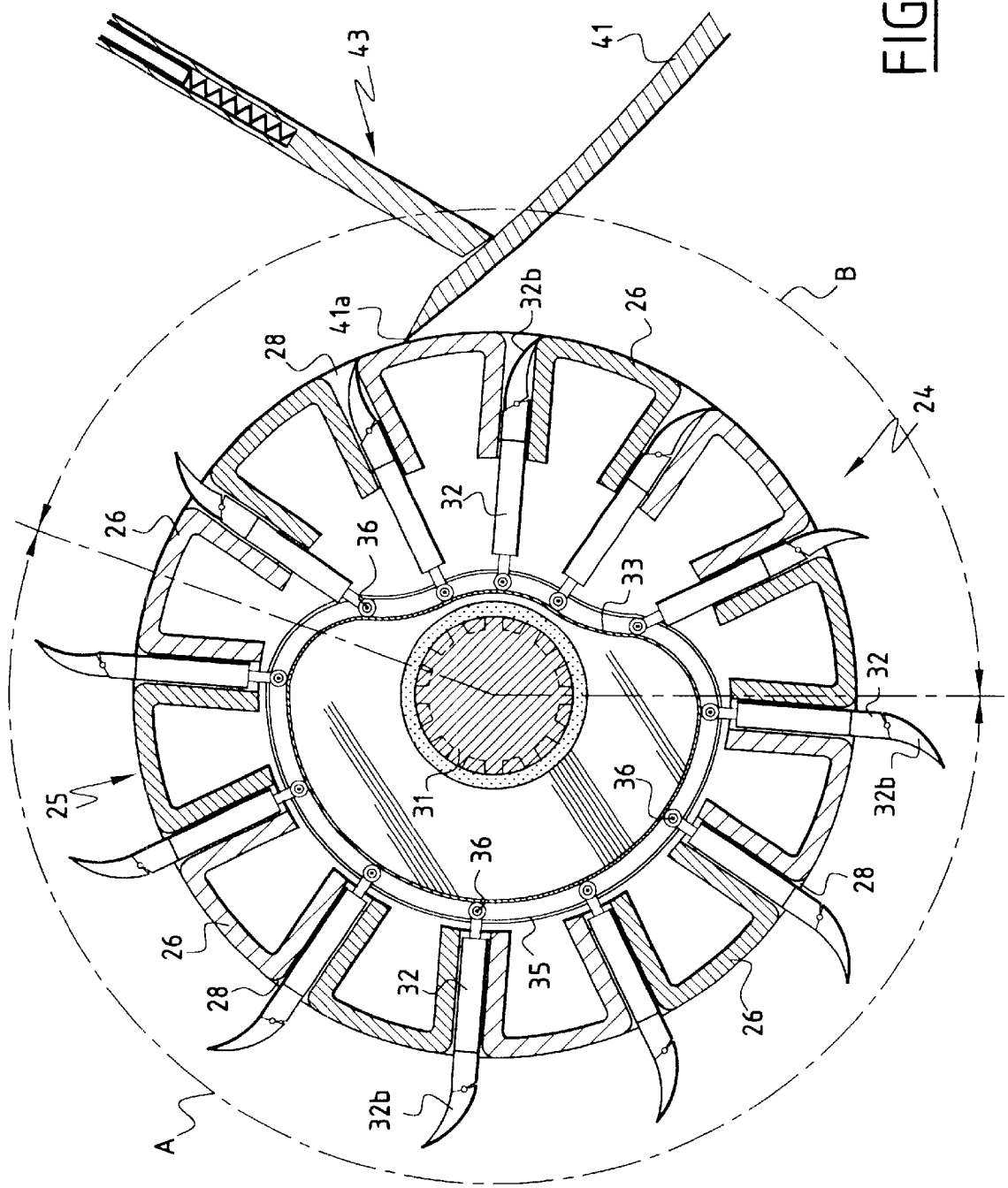
Figure 6:
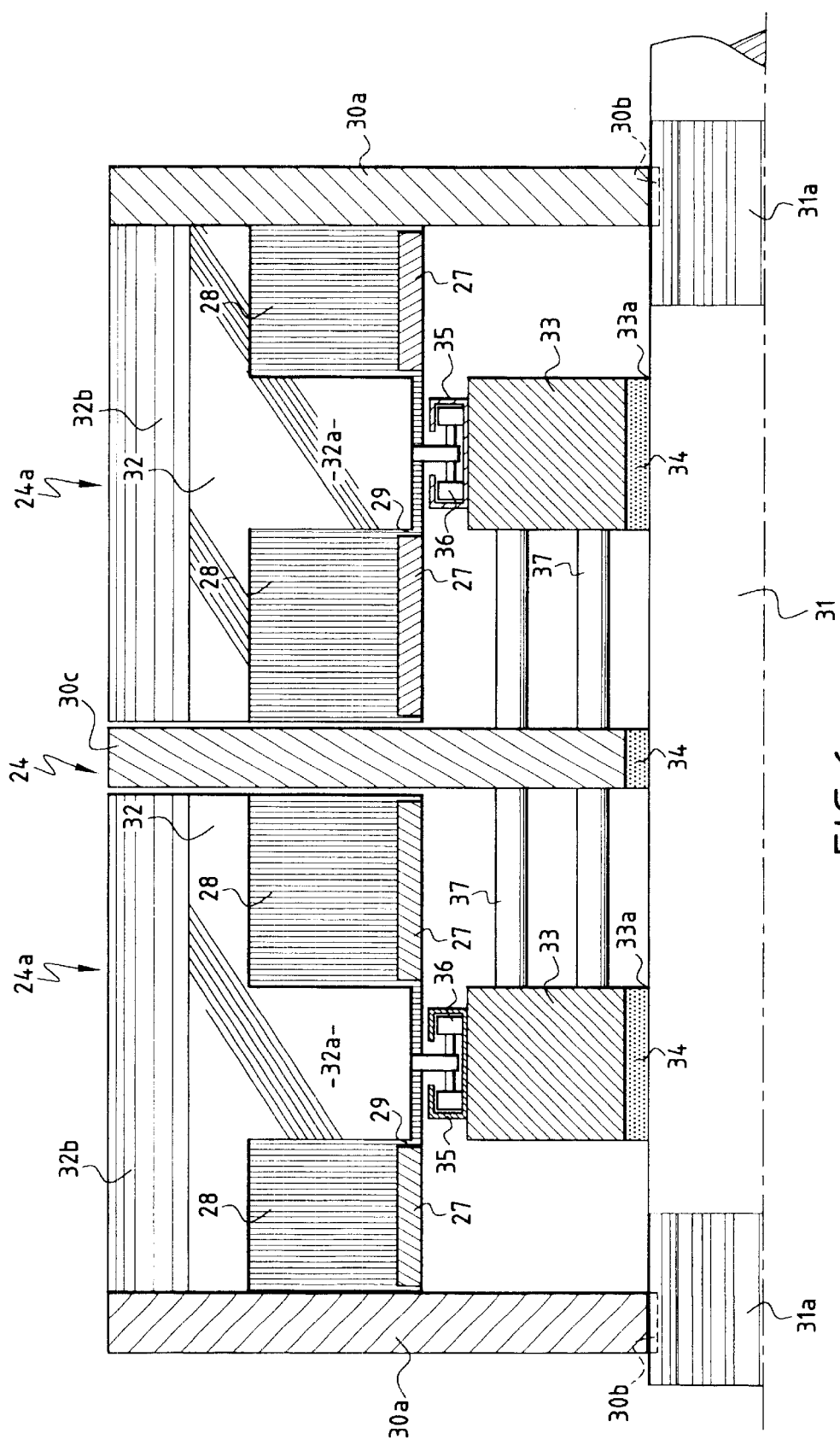
Figure 7:
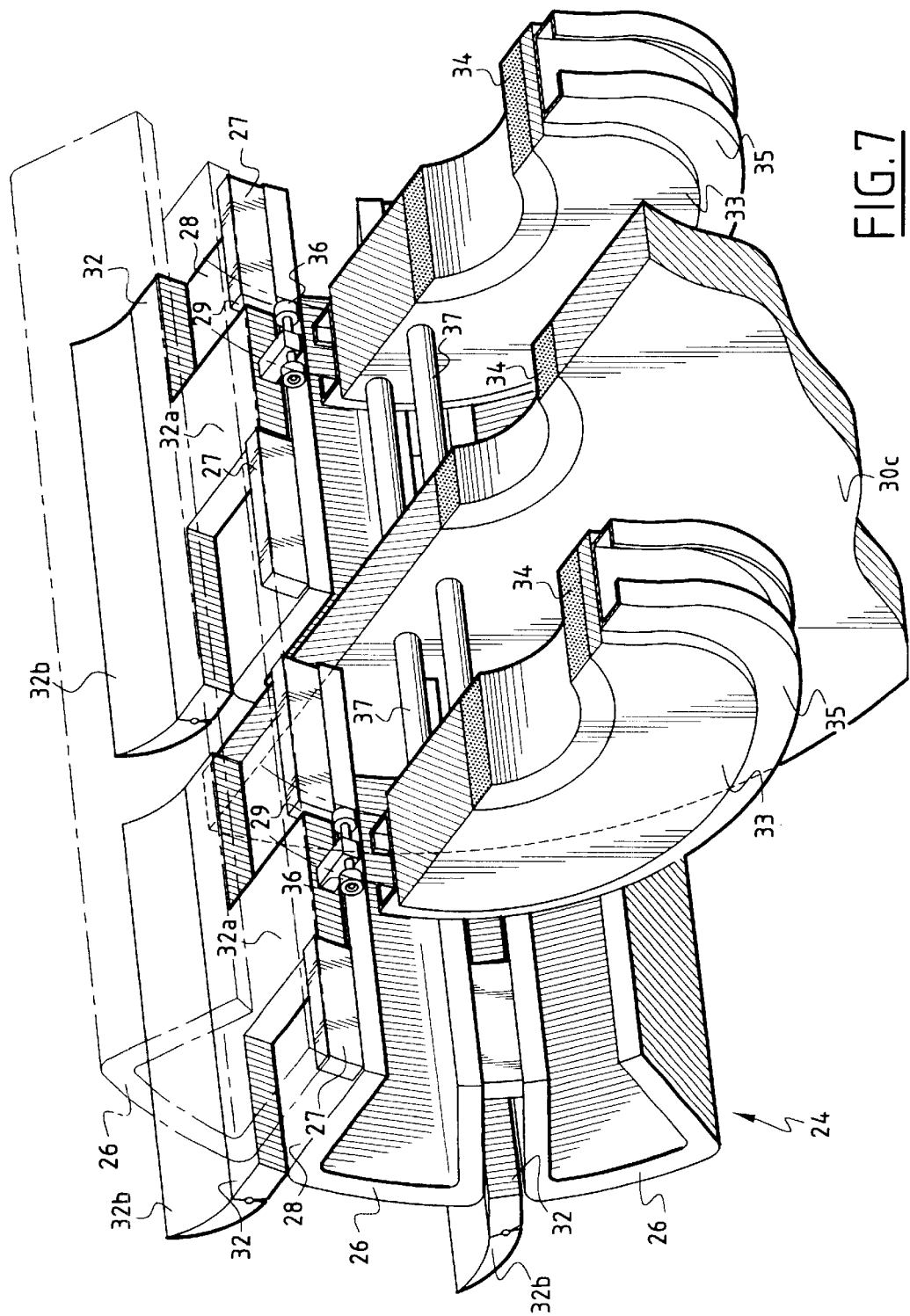
Figure 8:
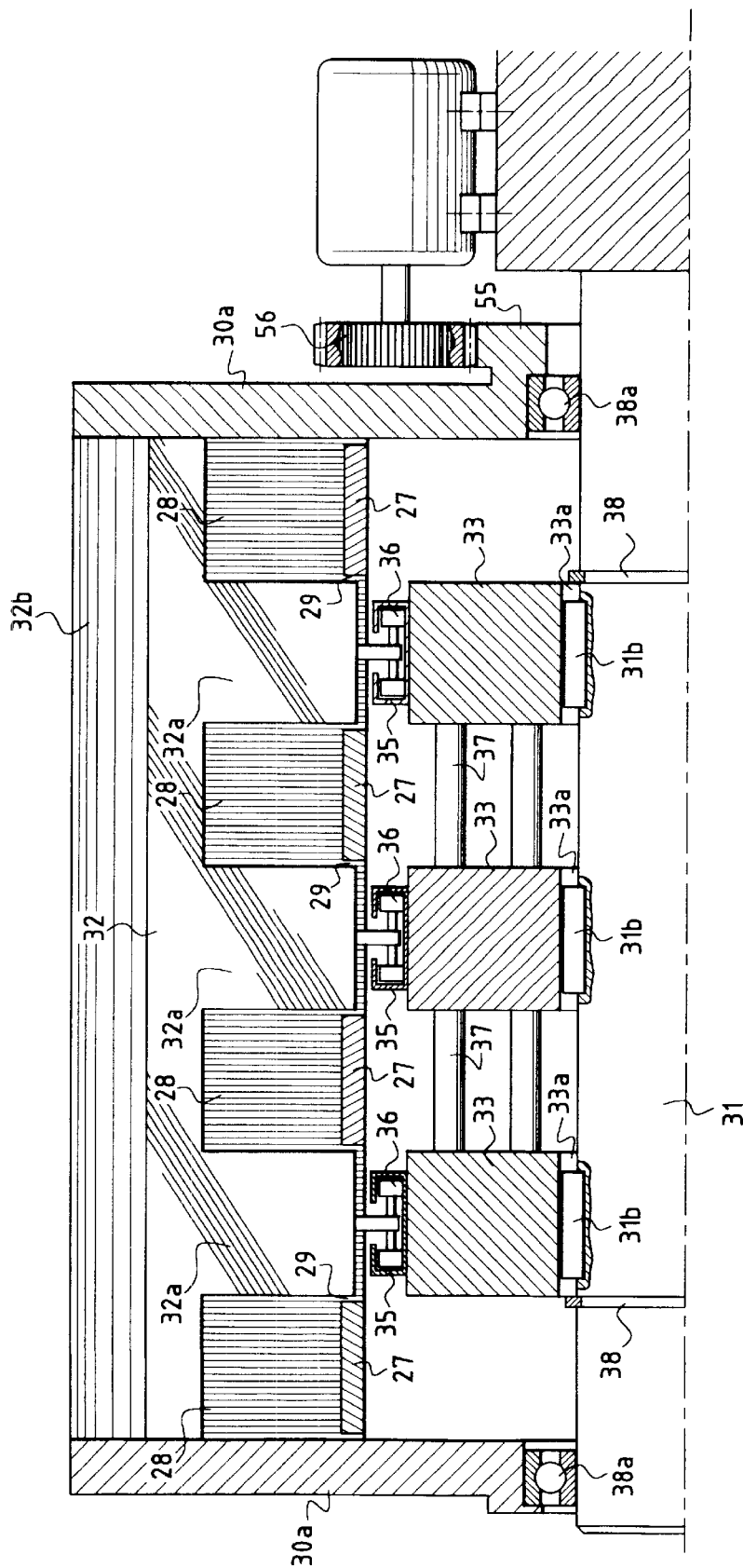

Other features and advantages of the invention will become apparent from reading the description which will follow, given by way of example and made with reference to the appended drawings, in which:

FIG. 1 is a schematic view showing a slick of petroleum products and an installation according to the invention for recovering these products, FIG. 2 is a schematic elevation of a logistic ship of the installation according to the invention, FIG. 3 is a schematic elevation of a ship for recovering petroleum products, FIG. 4 is a schematic view from above of the recovery ship depicted in FIG. 3, FIG. 5 is a schematic view in cross section of the collecting drum of the recovery ship, FIG. 6 is a schematic half-view in longitudinal section of the collecting drum, FIG. 7 is a schematic perspective view of a part of the collecting drum, FIG. 8 is a schematic half-view in longitudinal section showing a variant of the means for driving the rotation of the collecting drum.

FIG. 1 schematically depicts a slick 1 of petroleum products floating on the surface of the sea and originating, for example, from the wrecking of an oil tanker or from an uncontrolled discharge from an oil well on the seabed.

The mobile installation according to the invention for recovering the petroleum products of the slick 1 before they reach the shore is made up of a logistic ship 10 with a large storage capacity and of recovery ships 20.

As depicted schematically in FIGS. 1 and 2, this logistic ship 10 comprises, at its stern, an opening 11 which can be closed off by a swing flap 12. The swing flap 12 delimits an internal zone 13 formed in the hull 14 of the ship 10.

This internal zone 13 forms a zone for docking with at least one recovery ship 20 of smaller tonnage and intended to recover the petroleum products from the slick 1 and to transfer them to the logistic ship 10.

For this purpose, the ship 10 has a high storage capacity for the petroleum products recovered by the ships 20 and which consists of several tanks 16 spread out in the hull 14 of the said ship 10. This ship 10 is also equipped with means for transferring the petroleum products from the recovery ships 20 to the said tanks and which consist for example of pumping means or of endless screw conveyors or alternatively of bucket conveyors.

The flap 12 can be moved by appropriate means between a position in which the docking zone 13 is open, allowing water and recovery ships 20 to enter this docking zone 13, and a position in which this zone 13 is closed, thus placing the recovery ships 20 in shelter and allowing the petroleum products recovered by these ships 20 to be transferred into the storage tanks 16, even when there is a heavy swell.

A petroleum product recovery ship 20 will now be described with reference to FIGS. 3 and 4.

The recovery ship 20 is formed by a hull 21 and has its own means 22 of propulsion allowing it to travel between the logistic ship 10 and the slick 1 of petroleum products.

The front part of the hull 21 of the recovery ship 20 has a V-shaped opening 23 as depicted in FIG. 4 so that as the ship 20 moves along through the slick 1, some of the petroleum products enter this opening 23.

This opening 23 is provided with means for recovering the petroleum products floating on the surface of the sea and which means consist of a rotary and partially submerged collecting drum 24 comprising longitudinal elements that can be moved with respect to the external surface of this drum between two positions, projecting and retracted, as will be seen later on.

The ship 20 is also equipped, on the one hand, with a hopper 40 arranged behind the drum 24 and which allows the petroleum products removed from this drum 24 to be recovered and, on the other hand, with means 45 for transferring these products from the hopper 40 to at least one settling and storage tank 46 formed inside the hull 21.

One embodiment of the collecting drum 24 will now be described with reference to FIGS. 5 to 7.

This collecting drum 24 comprise a cylindrical outer denoted overall by the reference 25 and formed of circular sectors 26 separated from one another by discontinuous spacers 27 forming, between the edges of two adjacent sectors, a longitudinal slot 28 and, between the said edges and the spacers, radial passages 29 as depicted in FIGS. 6 and 7.

The juxtaposition of the circular sectors 26 between which the spacers 27 are inserted thus forms a succession of longitudinal slots 28, in each of which is placed an element that can be moved between the two positions, projecting and retracted.

The circular sectors 26 are joined together by the spacers 27 using appropriate means such as screw-fasteners or alternatively by welding, and also by two end plates 30a each fixed to one end of the said circular sectors 26, for example by welding.

The assembly consisting of the circular sectors 26 and of the end plates 30a is driven in rotation.

According to a first embodiment depicted in FIG. 6, the transverse shaft 31 is also driven in rotation by any appropriate means such as an electric motor or a hydraulic motor and the transverse shaft 31 rotates as one with the circular sectors 26 via the end plates 30a. The rotational connection between the shaft 31 and the circular sectors 26 is by any appropriate means.

In the embodiment depicted in the figures, the connection between the shaft 31 and the circular sectors 26 constituting the cylindrical outer 25 is by means of splines 31a formed at each end of the shaft 31 and which engage with complementary splines 30b formed in the axial orifice of each end plate 30a and through which the shaft 31 passes.

Thus, when the motor rotates the shaft 31, this shaft 31 rotates the end plates 30a via the splines 31a and 30b and these end plates 30a rotate the circular sectors 26 forming the outer 25 of the collecting drum 24 which act on the longitudinal elements 32.

As depicted in FIGS. 5 and 6, each longitudinal element is placed in a slot 28 and is formed by a sliding vane 32 connected to means of movement between the projecting position for scooping up the petroleum products and the retracted position in the hopper 40 for tipping these products out into the said hopper 40.

For this purpose and as depicted in FIGS. 5 and 6, the means of moving the sliding vanes 32 are formed of at least one fixed cam 33 comprising a cylindrical portion A concentric with the outer 25 and corresponding to the projecting position of the vanes 32 and a portion B curved towards the centre of the outer 25 and corresponding to the retracted position of the said vanes 32.

The cam 33 is stationary and comprises a central orifice 33a through which the shaft 31 passes, which shaft in this region has a plain external surface.

The central orifice 33a is equipped, for example, with a rolling bearing or with an appropriate bushing 34 to allow the shaft 31 to rotate freely inside the cam 33.

Furthermore, the means of moving the sliding vanes 32 are also formed of a guide rail 35 mounted on the edge face of the cam 33 and intended to collaborate with carriages 36 each connected to the foot 32a of a vane 32.

In the embodiment depicted in FIGS. 6 and 7, the means of moving the sliding vanes 32 are formed of two fixed and mutually parallel cams 33 each having, on its edge face, a rail 35 collaborating with carriages 36 each connected to the foot 32a of each vane 32.

The drum 24 is divided by an intermediate plate 30c into two half-drums 24a, each formed of circular sectors 26 determining slots 28 each equipped with a vane 32. The intermediate plate 30c has a central orifice equipped, for example, with a rolling bearing or with a bushing 34 to allow the shaft 31 to rotate freely inside this intermediate plate.

This intermediate plate 30c is stationary and is secured to a support not depicted.

The cams 33 are connected to the intermediate plate 30c, for example by through bolts 37.

The outer 25 of the collecting drum 24 is rotated by the shaft 31 and the end plates 30a and the circular sectors 26 drive the vanes 32 which move along the rail 35 via the carriages 36.

According to a variant depicted in FIG. 8, the transverse shaft 31 is stationary and the cams 33 are each fixed to this shaft 31, for example by a key 31b. The cams 33 are secured together, for example by through bolts 37, and are held in longitudinal position on the said shaft 31 by the washers 38 fixed to the said shaft 31 by snap-fastening.

In this case, the end plates 30a are mounted so that they can rotate freely on the shaft 31, for example by means of a rolling bearing 38a, and the outer 25 of the collecting drum 24 is rotated via an end plate 30a. For this purpose, one of the end plates 30a has a ring gear 55 which meshes with a pinion 56 which is itself driven by a motor, for example an electric or hydraulic motor.

In the portion A of the cams 33, the vanes 32 project with respect to the external surface of the outer 25 and when the carriages 36 reach the zone B of the cams 33, the vanes 32 gradually retract into the slots 28 formed in the said outer 25 of the drum 24, as depicted in FIG. 5.

Each vane 32 extends over the entire length of the corresponding slot 28 between the two end plates 30a and it is equipped at its free end with a tip 32b which makes an angle with the main part of the vane 32 when the said vanes are in the portion A of the cams 33 and which are in the continuation of the said central part of each vane 32 when the said vanes 32 are retracted inside the slots 28, that is to say in the portion B of the cams 33.

Each tip 32b is kept in the curved position with respect to the central part of the corresponding vane 32 by an appropriate member, not depicted, for example a spring.

The collecting drum 24 is associated with means for scraping the external surface of the outer 25 to remove the petroleum products recovered by the vanes 32.

In the embodiment depicted in the figures, the scraping means are formed by the upper edge 41a of the front wall of the hopper 41 and which is kept pressed against the external surface of the outer 25 by at least one elastic return member, not depicted.

The lower edge of the front wall 41 of the hopper 40 is hinged about a horizontal axle 42 (FIG. 3) such that this front wall 41 pivots about the said horizontal axle 42 and such that the upper edge 41 remains pressed against the external surface of the outer 25 of the drum 24 for all positions of the said drum 24.

The hopper 40 is equipped with a member 43 for scraping the internal surface of the front wall 41 so as to push the petroleum products towards the bottom of the said hopper 40.

By way of example, the scraping member is formed of a telescopic blade 43 pivoted about a hinge pin 44 between the upper and lower edges of the front wall 41 of the said hopper 40. The pivoting blade 43 is moved by any appropriate means.

The means 45 for transferring the petroleum products from the hopper 40 to the tank 46 may consist of conventional conveying means such as endless screws, pumping systems or bucket conveyors for example.

The collecting drum 24 is mounted so that it can be moved vertically, for example by means of hydraulic or pneumatic rams 39 so as to keep the said drum at a constant height with respect to sea level and according to the water line of the ship 20.

As depicted in FIG. 3, the ship 20 is also equipped with at least one stabilizer plate 47 that can be moved between a position applied against the bottom of the hull 21, as depicted in dotted line in FIG. 3, and a position away from the said bottom, as depicted in solid line in this figure. The stabilizing plate 47 can be moved, for example, using hydraulic or pneumatic rams 48.

In the position away from the bottom of the hull 21, the stabilizing plate 47 makes it possible to create, between this bottom and the said plate, a sheet of water that thus allows the ship 20 to be stabilized.

In addition, the stabilizing plate 47 also acts as a plate via which the recovery ship 20 can press against the bottom of the docking zone 13 inside the logistic ship 10.

As soon as a slick 1 of petroleum products floating at the surface of the sea has been detected, the logistic ship 10 is dispatched with haste to the zone. The recovery ships 20 are put to sea after the flap 12 located at the stern of this logistic ship 10 has been opened and the ships 20 begin to recover the petroleum products.

To do that, the collecting drum 20 is rotated and this rotation allows the petroleum products to be collected.

What happens is that the vanes 32 form, with the external surface of the outer 25, buckets in the portion A of the cams 33, which allows the petroleum products on the surface of the sea to be collected, and these vanes 32 retract into the slots 28 in the portion B of the said cams 33.

The petroleum products on the external surface of the outer 25 of the drum 24 are detached from this outer 25 by the upper edge 41a of the front wall 41 of the hopper 40 and drop into the bottom of the said hopper 40. The telescopic blade 43 is regularly moved between the upper and lower edges of the front wall 41 so as to push these petroleum products into the bottom of this hopper 40.

The petroleum products are constantly removed to the settling and storage tank 46 of the recovery ship 20 by the transfer means 45.

The stabilizing plate 47 is moved away from the bottom of the hull 21 by the rams 48 to an extent that is dependent on the degree of fill of this tank so as to stabilize the recovery ship 20.

Likewise, the rams 39 move the collecting drum 24 vertically to keep it partially submerged in the water so as to achieve optimum effectiveness.

According to a variant, the side walls of the open front part of the recovery ship 20 have intakes 50 for the petroleum products, which intakes are connected to the storage tank 46.

These intakes can be used to supplement the collecting drum 24 when the petroleum products have a low viscosity.

As soon as the tank 46 of a recovery ship 20 is full, this ship returns to the logistic ship 10 and enters the docking zone 13 formed within this ship 10.

The stabilizing plate 47 of the recovery ship 20 is pressed against the bottom of the docking zone 13 so as to stabilize the recovery ship 20 and the petroleum products recovered are removed from the tank 46 of the said ship 20 and transferred to the storage tank of the logistic ship 20 by any appropriate means such as endless screws, bucket conveyors or suction systems.

While the petroleum products are stored in the tank 16 of the logistic ship 10, these petroleum products may undergo various treatments.

As soon as the storage tanks of the logistic ship 10 are full, this ship returns to the nearest port to empty them.

Because of the proximity of the logistic ship to the slicks of petroleum products floating on the surface of the sea, these petroleum products can be recovered more quickly and can be recovered before they reach the nearest shoreline.

In addition, the petroleum products can be transferred between the recovery ships and the tanks of the logistic ship in complete safety, even in rough seas.

Finally, the recovery ship according to the invention allows for swift intervention in the polluted zone and allows petroleum products of low or high viscosity to be collected in an optimum way.

What is claimed is:

1. Ship for recovering petroleum products floating on the surface of the sea, characterized in that it comprises:

an open front part equipped with a rotary collecting drum (24) which is partially submerged and comprises longitudinal elements (32) that can be moved with respect to the external surface of this drum (24) between two positions, one projecting, one retracted, a hopper (40) situated behind the said drum (24) for collecting and recovering the petroleum products removed by this drum (24), and means (45) for transferring these petroleum products from the hopper (40) to at least one settling and storage tank (46), and in that the collecting drum (24) comprises a cylindrical outer (25) driven in rotation and equipped, at regular intervals, with longitudinal slots (28) each containing one of the said elements (32) formed of a vane (32) sliding in the corresponding slot (28) and connected to means (33, 35, 36) of movement between the projecting position for scooping up the petroleum products and the retracted position in the region of the hopper (40) for tipping these products out into the said hopper (40), the means of moving the sliding vanes (32) being formed, on the one hand, of at least one stationary cam (33) having a cylindrical portion concentric with the outer (25) and corresponding to the projecting position of the vanes (32) and a position curved in towards the centre of the outer (25) and corresponding to the retracted position of the said vanes (32) and, on the other hand, of a guide rail (35) mounted on the edge face of the said cam (33) and intended to collaborate with carriages (36) each connected to the foot (32*a*) of a vane (32).

2. Ship according to claim 1, characterized in that the outer (25) of the drum (24) is formed of circular sectors (26) separated from one another by spacer pieces (27) forming between the edges of the two adjacent sectors (26) the said longitudinal slot (28) and radial passages (29) through which the foot (32*a*) of the corresponding vane (32) passes.

3. Ship according to claim 2, characterized in that the drum (24) can be moved vertically.

4. Ship according to claim 2, characterized in that the collecting drum (24) is associated with means (41, 41*a*) for scraping the external surface of the outer (25).

5. Mobile installation for storing and transporting petroleum products, characterized in that it comprises a logistic ship (10), the hull (14), of which is equipped with at least one storage tank (16), with a zone (13) for docking with at least one recovery ship (20) according to claim 2 and with means for transferring these petroleum products from the said recovery ship (2) to the said tank (16).

6. Ship according to claim 1, characterized in that the drum (24) can be moved vertically.

7. Mobile installation for storing and transporting petroleum products, characterized in that it comprises a logistic ship (10), the hull (14) of which is equipped with at least one storage tank (16), with a zone (13) for docking with at least one recovery ship (20) according to claim 6 and with means for transferring these petroleum products from the said recovery ship (2) to the said tank (16).

8. Ship according to claim 1, characterized in that the collecting drum (24) is associated with means (41, 41*a*) for scraping the external surface of the outer (25).

9. Mobile installation for storing and transporting petroleum products, characterized in that it comprises a logistic ship (10), the hull (14) of which is equipped with at least one storage tank (16), with a zone (13) for docking with at least one recovery ship (20) according to claim 8 and with means for transferring these petroleum products from the said recovery ship (2) to the said tank (16).

10. Ship according to claim 8, characterized in that the scraping means are formed by the upper edge (41*a*) of the front wall (40) of the hopper (40) kept pressed against the external surface of the outer (25) by at least one elastic return member.

11. Mobile installation for storing and transporting petroleum products, characterized in that it comprises a logistic ship (10), the hull (14) of which is equipped with at least one storage tank (16), with a zone (13) for docking with at least one recovery ship (20) according to claim 10 and with means for transferring these petroleum products from the said recovery ship (2) to the said tank (16).

12. Ship according to claim 10, characterized in that the lower edge of the front wall (41) of the hopper (40) is hinged about a horizontal axle (42).

13. Mobile installation for storing and transporting petroleum products, characterized in that it comprises a logistic ship (10), the hull (14) of which is equipped with at least one storage tank (16), with a zone (13) for docking with at least one recovery ship (20) according to claim 12 and with means for transferring these petroleum products from the said recovery ship (2) to the said tank (16).

14. Ship according to claim 1, characterized in that the hopper (40) is equipped with a scraping member (43) at the internal surface of the front wall (41) so as to push the petroleum products towards the bottom of the said hopper (40).

15. Mobile installation for storing and transporting petroleum products, characterized in that it comprises a logistic ship (10), the hull (14) of which is equipped with at least one storage tank (16), with a zone (13) for docking with at least one recovery ship (20) according to claim 14 and with means for transferring these petroleum products from the said recovery ship (2) to the said tank (16).

16. Ship according to claim 14, characterized in that the scraping member is formed of a telescopic blade (43) hinged about a hinge pin (44) between the upper and lower edges of the front wall (41) of the said hopper (40).

17. Mobile installation for storing and transporting petroleum products, characterized in that it comprises a logistic ship (10), the hull (14) of which is equipped with at least one storage tank (16), with a zone (13) for docking with at least one recovery ship (20) according to claim 16 and with means for transferring these petroleum products from the said recovery ship (2) to the said tank (16).

18. Ship according to claim 1, characterized in that the side walls of the open front part of the said recovery ship comprise intakes (50) for the petroleum products, which intakes are connected to the said storage tank (46).

19. Mobile installation for storing and transporting petroleum products, characterized in that it comprises a logistic ship (10), the hull (14) of which is equipped with at least one storage tank (16), with a zone (13) for docking with at least one recovery ship (20) according to claim 18 and with means for transferring these petroleum products from the said recovery ship (2) to the said tank (16).

20. Ship according to claim 1, characterized in that it comprises at least one stabilizer plate (47) which can be moved between a position pressed against the bottom of the hull (21) and a position away from the said bottom.

21. Mobile installation for storing and transporting petroleum products, characterized in that it comprises a logistic ship (10), the hull (14) of which is equipped with at least one storage tank (16), with a zone (13) for docking with at least one recovery ship (20) according to claim 20 and with means for transferring these petroleum products from the said recovery ship (2) to the said tank (16).

22. Mobile installation for storing and transporting petroleum products, characterized in that it comprises a logistic ship (10), the hull (14) of which is equipped with at least one storage tank (16), with a zone (13) for docking with at least one recovery ship (20) according to claim 1 and with means for transferring these petroleum products from the said recovery ship (2) to the said tank (16).

23. Mobile installation according to claim 22, characterized in that the docking zone (13) is formed inside the logistic ship (10) and communicates with the sea via the stern of the said logistic ship.

* * * * *